Figure 1:
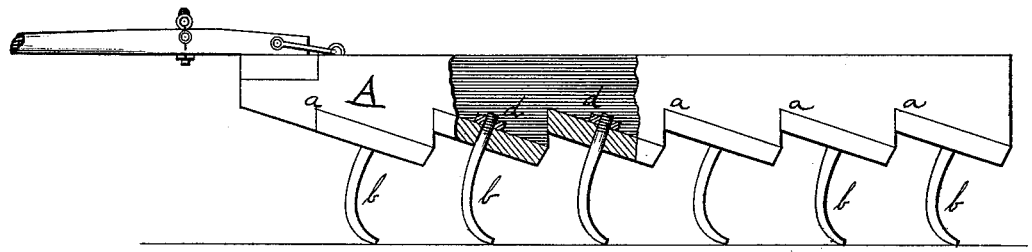
Figure 2:
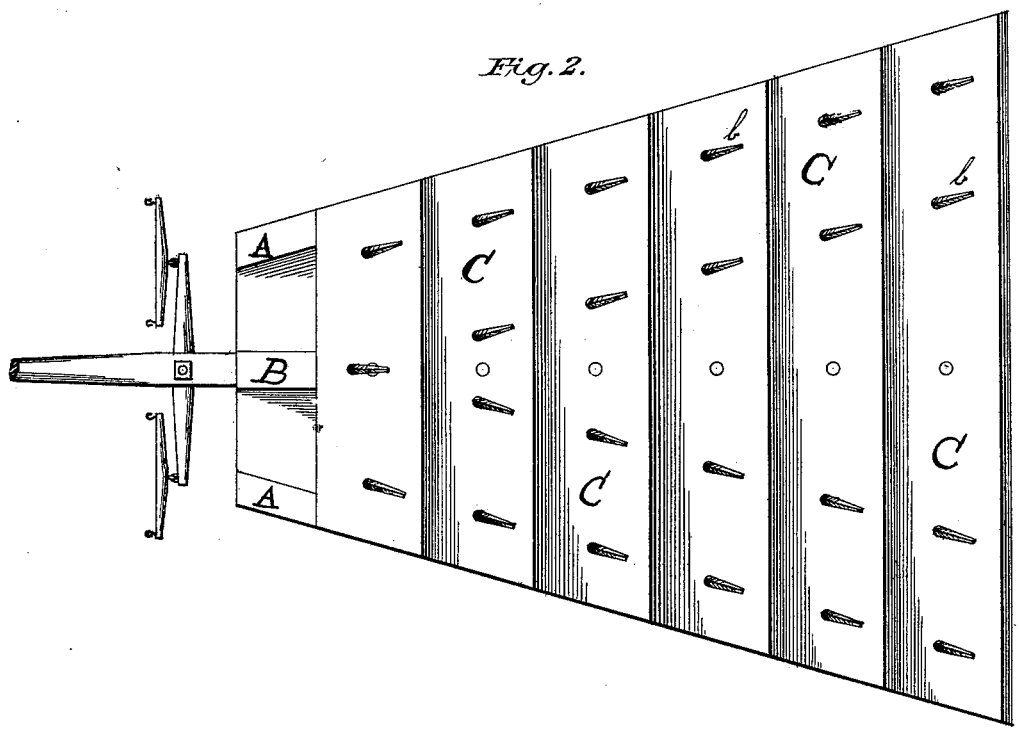

J. M. MURPHY.
Harrow and Clod Crusher.

No. 221,598. Patented Nov. 11, 1879.

WITNESSES

INVENTOR
James M. Murphy
By H. J. Ennis,
ATTORNEY

UNITED STATES PATENT OFFICE.

JAMES M. MURPHY, OF BLACK JACK GROVE, TEXAS, ASSIGNOR OF ONE-THIRD OF HIS RIGHT TO J. J. MURPHY AND J. H. MURPHY, OF SAME PLACE.

IMPROVEMENT IN HARROWS AND CLOD-CRUSHERS.

Specification forming part of Letters Patent No. 221,598, dated November 11, 1879; application filed October 12, 1878.

*To all whom it may concern:*

Be it known that I, JAMES M. MURPHY, of Black Jack Grove, in the county of Hopkins and State of Texas, have invented certain new and useful Improvements in Harrows and Clod-Crushers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention has relation to harrows and clod-crushers; and it consists in the improvements in the construction of the same hereinafter fully described, and particularly pointed out in the claim.

In the accompanying drawings similar letters of reference indicate corresponding parts in the several figures.

The outer beams, A A, converge from rear to front. The central beam, B, is horizontal. These three beams are recessed at $a$ in their under edges, the inclines of said recesses $a$ being at angles of about twenty-two and one-half degrees to the upper horizontal faces of said beams. Cross pieces or slats C are secured to these under faces or recessed edges, and operate as pulverizers, irrespective of the cutting action of the cimeter-teeth $b$, to be hereinafter described. These cimeter-teeth $b$ are so called because they are made in the form of cimeters, so far as their curves are concerned. Their forward or front edges are cutting-edges, and their rear or back edges are made thick to afford the necessary strength.

The shanks of the teeth are provided with screw-threads for the reception of screw-nuts, by which they are rigidly, but removably, secured to the cross-beams C, and the cutting-edges of the teeth, being arranged obliquely to the line of the draft, and the series converging from the front toward the rear, turn the soil, and thus more thoroughly pulverize it.

The slats or cross-pieces themselves act upon the clods to pulverize them after the teeth have acted to cut them.

By removing the teeth $b$ the slats C serve to plane or smooth the surface of the ground after it has been harrowed.

I am aware that cimeter-shaped teeth, also diverging beams, in connection with a longitudinal central beam having transverse pulverizing-beams overlapping each other and secured thereto by the teeth, and also parallel beams provided with oblique notches for the reception of transverse pulverizing-beams, are common in harrows; also, that removable teeth have been used with clod-crushers; and such I do not desire to claim, broadly, as my invention; but,

Having thus described my invention, what I claim as new and useful, and desire to secure by Letters Patent of the United States, is—

The herein-described device for crushing clods, harrowing, and finally smoothing the surface of the prepared ground, consisting of the diverging side bars, A A, and central bar, B, provided with oblique cuts $a$ on their under sides, the series of transverse inclined pulverizing-beams C, increasing in length from front to rear, and provided with the series of removably-secured cimeter-shaped teeth $b$, substantially as shown and described.

In testimony that I claim the foregoing as my own I affix my signature in presence of two witnesses.

JAMES M. MURPHY.

Witnesses:
 D. C. HUTCHENS,
 C. R. DAVIS.